United States Patent
Nookala et al.

(10) Patent No.: US 9,384,774 B1
(45) Date of Patent: Jul. 5, 2016

(54) DATA STORAGE DEVICE CALIBRATING A LASER POWER FOR HEAT ASSISTED MAGNETIC RECORDING BASED ON SLOPE OF QUALITY METRIC

(71) Applicant: Western Digital Technologies, Inc., Irvine, CA (US)

(72) Inventors: Poornima Nookala, Irvine, CA (US); Phillip Scott Haralson, Huntington Beach, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/666,080

(22) Filed: Mar. 23, 2015

(51) Int. Cl.
| | |
|---|---|
| G11B 7/00 | (2006.01) |
| G11B 20/10 | (2006.01) |
| G11B 7/1267 | (2012.01) |
| G11B 7/007 | (2006.01) |
| G11B 7/1263 | (2012.01) |

(52) U.S. Cl.
CPC .......... *G11B 7/1267* (2013.01); *G11B 7/00736* (2013.01); *G11B 7/1263* (2013.01); *G11B 20/10009* (2013.01); *G11B 20/10481* (2013.01)

(58) Field of Classification Search
CPC ........... G11B 7/1267; G11B 20/10009; G11B 20/10481; G11B 7/00456; G11B 7/00736; G11B 7/062; G11B 7/0079; G11B 7/1263
USPC .......................... 360/77.08, 77.02, 66, 62, 55; 369/13.04, 13.05, 13.1, 13.16, 369/13.24–13.27, 47.5–47.55, 53.2, 59.1, 369/124.1
See application file for complete search history.

(56) References Cited

U.S. PATENT DOCUMENTS

| | | |
|---|---|---|
| 5,500,776 A | 3/1996 | Smith |
| 5,691,857 A | 11/1997 | Fitzpatrick et al. |
| 5,949,602 A | 9/1999 | Ishioka et al. |
| 6,008,962 A | 12/1999 | Le et al. |
| 6,018,789 A | 1/2000 | Sokolov et al. |
| 6,025,969 A | 2/2000 | Ishioka et al. |
| 6,061,201 A | 5/2000 | Woods |
| 6,065,095 A | 5/2000 | Sokolov et al. |
| 6,078,452 A | 6/2000 | Kittilson et al. |
| 6,081,447 A | 6/2000 | Lofgren et al. |
| 6,092,149 A | 7/2000 | Hicken et al. |
| 6,092,150 A | 7/2000 | Sokolov et al. |
| 6,094,707 A | 7/2000 | Sokolov et al. |
| 6,105,104 A | 8/2000 | Guttmann et al. |
| 6,111,717 A | 8/2000 | Cloke et al. |
| 6,145,052 A | 11/2000 | Howe et al. |
| 6,175,893 B1 | 1/2001 | D'Souza et al. |
| 6,178,056 B1 | 1/2001 | Cloke et al. |
| 6,191,909 B1 | 2/2001 | Cloke et al. |
| 6,195,218 B1 | 2/2001 | Guttmann et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |

(Continued)

*Primary Examiner* — Dionne H Pendleton

(57) ABSTRACT

A data storage device is disclosed comprising a disk and a head actuated over the disk, wherein the head comprises a laser configured to heat the disk while writing data to the disk. The laser power is adjusted and a pattern is written to a target track at the adjusted laser power. The pattern is read from the target track to generate a read signal, and a quality metric is generated based on the read signal. The process is repeated at least once, and a write power for the laser is configured based on a slope of the quality metric.

26 Claims, 7 Drawing Sheets

(56) References Cited

U.S. PATENT DOCUMENTS

| | | |
|---|---|---|
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,293,135 B1 | 9/2001 | Marchon et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,421,197 B1 | 7/2002 | Abdelnour |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,476,992 B1 | 11/2002 | Shimatani |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,510,017 B1 | 1/2003 | Abdelnour |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,631,046 B2 | 10/2003 | Szita et al. |
| 6,639,748 B1 | 10/2003 | Christiansen et al. |
| 6,647,481 B1 | 11/2003 | Luu et al. |
| 6,650,491 B2 | 11/2003 | Suzuki et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,700,724 B2 | 3/2004 | Riddering et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,042 B2 | 6/2004 | Bi et al. |
| 6,751,402 B1 | 6/2004 | Elliott et al. |
| 6,754,030 B2 | 6/2004 | Seng et al. |
| 6,757,481 B1 | 6/2004 | Nazarian et al. |
| 6,765,744 B2 | 7/2004 | Gomez et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,785,081 B2 | 8/2004 | Chapin et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,947,248 B2 | 9/2005 | Allen et al. |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |

(56) References Cited

U.S. PATENT DOCUMENTS

| | | |
|---|---|---|
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,180,692 B1 | 2/2007 | Che et al. |
| 7,193,809 B1 | 3/2007 | Allen |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,265,930 B2 | 9/2007 | Nakamura et al. |
| 7,271,977 B1 | 9/2007 | Melrose et al. |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,401 B2 | 11/2007 | Shen et al. |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,423,830 B2 | 9/2008 | Ma et al. |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,583,466 B2 | 9/2009 | Kermiche et al. |
| 7,596,797 B1 | 9/2009 | Kapner, III et al. |
| 7,599,139 B1 | 10/2009 | Bombet et al. |
| 7,616,398 B2 | 11/2009 | Gong et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,796,356 B1 | 9/2010 | Fowler et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,864,475 B2 | 1/2011 | Nakamura |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B1 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,000,053 B1 | 8/2011 | Anderson |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |

(56) References Cited

U.S. PATENT DOCUMENTS

| | | |
|---|---|---|
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 8,753,146 B1 | 6/2014 | Szeremeta et al. |
| 8,755,136 B1 | 6/2014 | Ng et al. |
| 8,756,361 B1 | 6/2014 | Carlson et al. |
| 8,760,782 B1 | 6/2014 | Garani et al. |
| 8,760,792 B1 | 6/2014 | Tam |
| 8,769,593 B1 | 7/2014 | Schwartz et al. |
| 8,773,793 B1 | 7/2014 | McFadyen |
| 8,773,802 B1 | 7/2014 | Anderson et al. |
| 8,773,807 B1 | 7/2014 | Chia et al. |
| 8,773,957 B1 | 7/2014 | Champion et al. |
| 8,780,470 B1 | 7/2014 | Wang et al. |
| 8,782,334 B1 | 7/2014 | Boyle et al. |
| 8,786,976 B1 | 7/2014 | Kang et al. |
| 8,787,125 B1 | 7/2014 | Lee |
| 8,792,196 B1 | 7/2014 | Lee |
| 8,792,200 B1 | 7/2014 | Tam et al. |
| 8,797,667 B1 | 8/2014 | Barlow et al. |
| 8,799,977 B1 | 8/2014 | Kapner, III et al. |
| 8,817,413 B1 | 8/2014 | Knigge et al. |
| 8,817,584 B1 | 8/2014 | Selvaraj |
| 8,825,976 B1 | 9/2014 | Jones |
| 8,825,977 B1 | 9/2014 | Syu et al. |
| 8,929,186 B1 | 1/2015 | Sharma et al. |
| 2002/0024903 A1* | 2/2002 | Sato ............ G11B 7/126 369/47.53 |
| 2007/0291401 A1 | 12/2007 | Sun et al. |
| 2008/0285401 A1* | 11/2008 | Ito ............ G11B 20/10009 369/47.5 |
| 2009/0113702 A1 | 5/2009 | Hogg |
| 2009/0168623 A1* | 7/2009 | Furumiya ............ G11B 7/1267 369/53.2 |
| 2010/0306551 A1 | 12/2010 | Meyer et al. |

(56) References Cited

U.S. PATENT DOCUMENTS

| | | |
|---|---|---|
| 2011/0205861 A1 | 8/2011 | Erden et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |

* cited by examiner

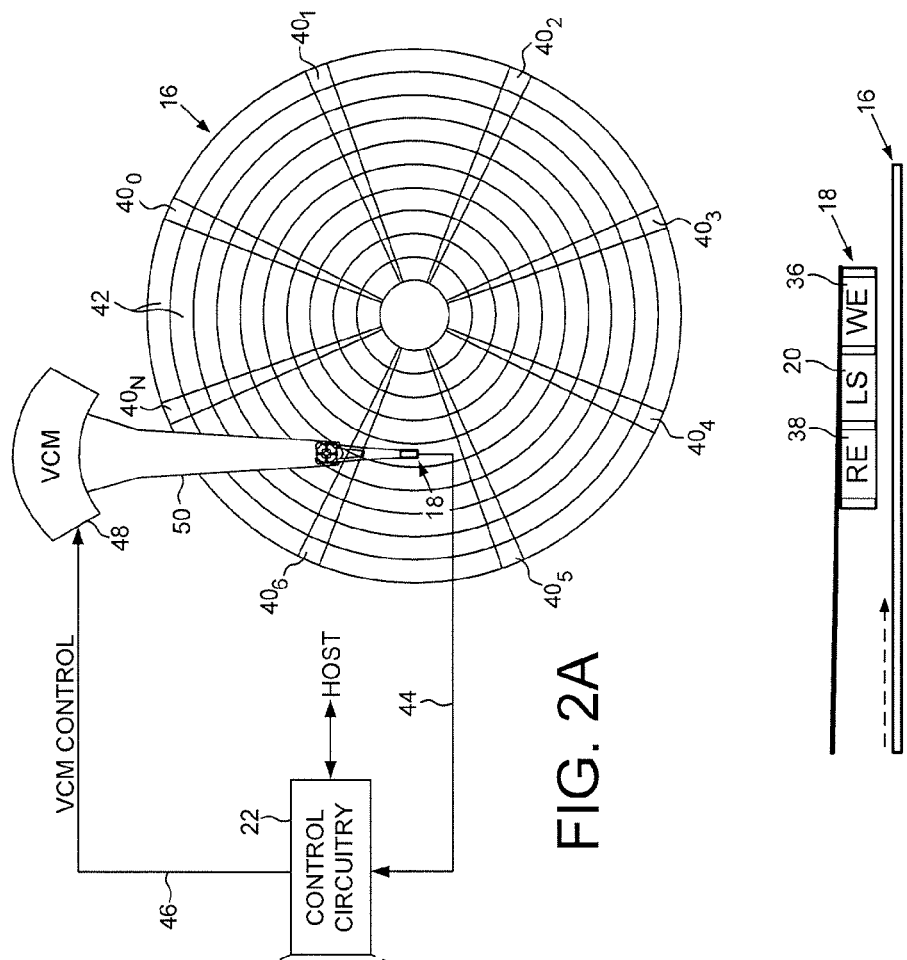
FIG. 2A
FIG. 2B
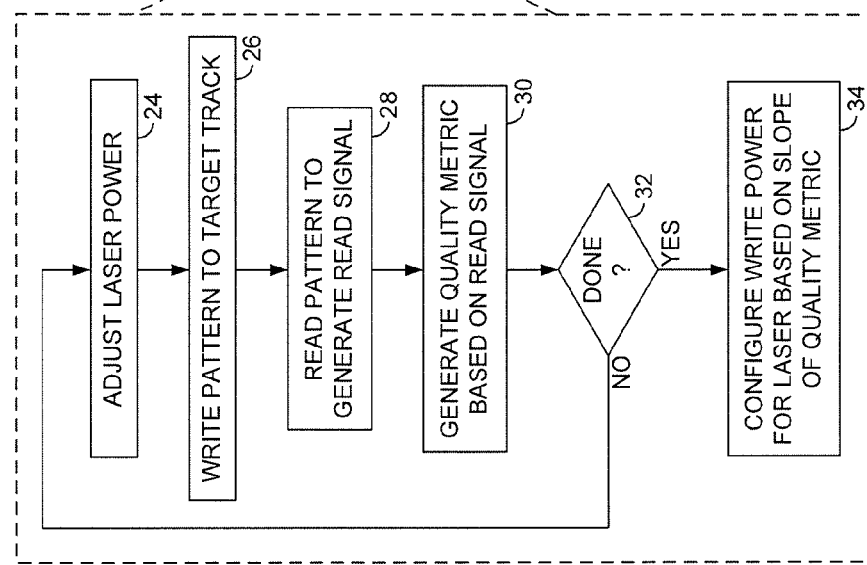
FIG. 2C

DATA STORAGE DEVICE CALIBRATING A LASER POWER FOR HEAT ASSISTED MAGNETIC RECORDING BASED ON SLOPE OF QUALITY METRIC

CROSS REFERENCE TO RELATED APPLICATION(S)

This application is related to co-pending U.S. patent application Ser. No. 14/666,118 filed on Mar. 23, 2015, entitled "DATA STORAGE DEVICE MEASURING RADIAL OFFSET BETWEEN READ ELEMENT AND WRITE ELEMENT," to Phillip Haralson, which is hereby incorporated by reference in its entirety.

BACKGROUND

Data storage devices such as disk drives may comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the actuator arm as it seeks from track to track.

Data is typically written to the disk by modulating a write current in an inductive coil to record magnetic transitions onto the disk surface in a process referred to as saturation recording. During readback, the magnetic transitions are sensed by a read element (e.g., a magnetoresistive element) and the resulting read signal demodulated by a suitable read channel. Heat assisted magnetic recording (HAMR) is a recent development that improves the quality of written data by heating the disk surface with a laser during write operations in order to decrease the coercivity of the magnetic medium, thereby enabling the magnetic field generated by the write coil to more readily magnetize the disk surface.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 2A shows a data storage device in the form of a disk drive according to an embodiment comprising a head actuated over the disk.

FIG. 2B shows a head according to an embodiment comprising a laser configured to heat the disk during write operations.

FIG. 2C is a flow diagram according to an embodiment wherein a pattern is written to a target track at different laser powers, the pattern is read to generate a quality metric at each laser power, and a write laser power is configured based on a slope of the quality metrics.

DETAILED DESCRIPTION

Figure 1:
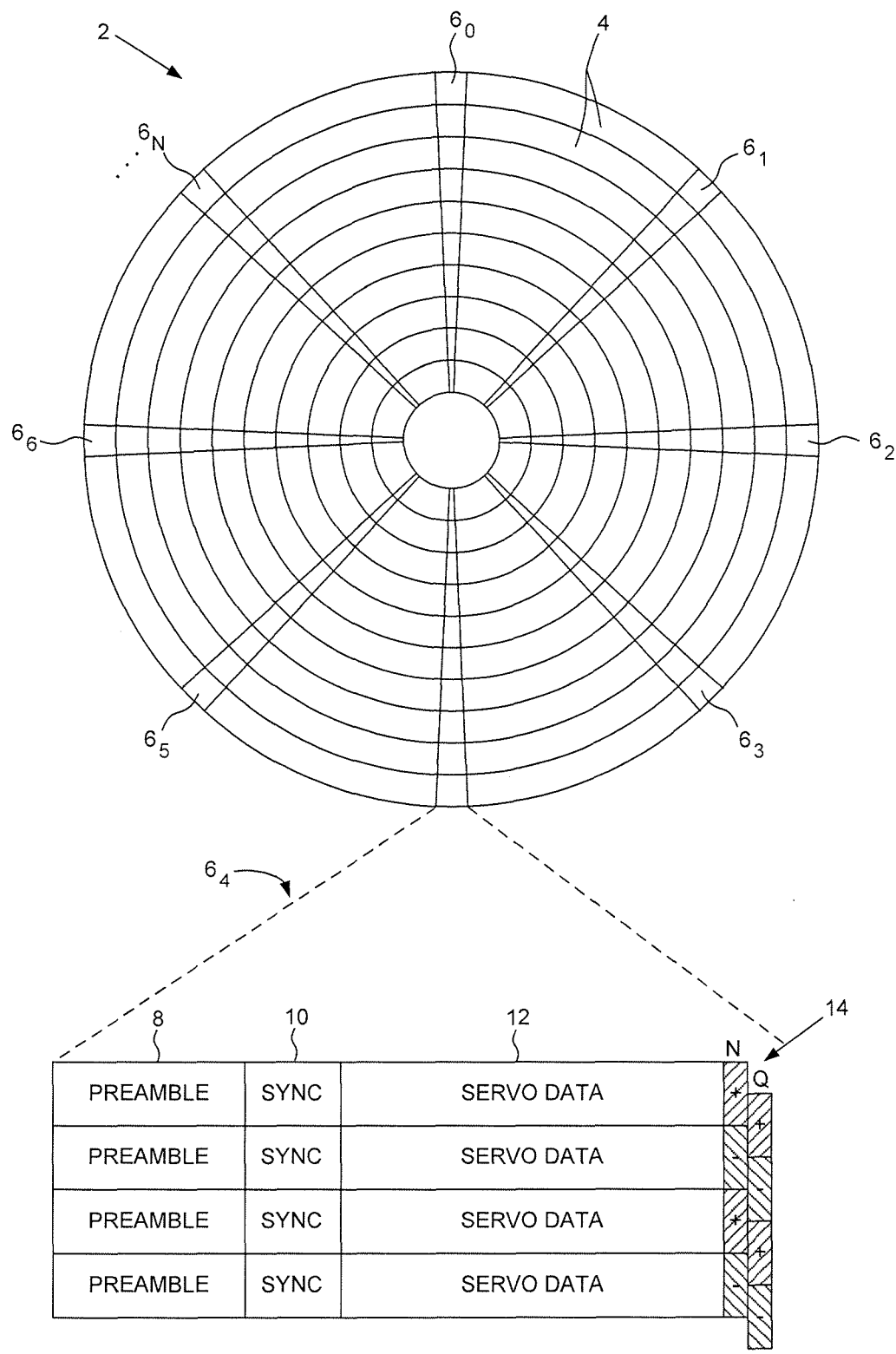
FIG. 1 shows a prior art disk format comprising a plurality of servo tracks defined by servo sectors.

FIG. 2A shows a data storage device in the form of a disk drive according to an embodiment comprising a disk 16 and a head 18 actuated over the disk 16, the head 18 comprising a laser 20 (FIG. 2B) configured to heat the disk 16 while writing data to the disk 16. The disk drive further comprises control circuitry 22 configured to execute the flow diagram of FIG. 2C, wherein the laser power is adjusted (block 24) and a pattern is written to a target track at the adjusted laser power (block 26). The pattern is read from the target track to generate a read signal (block 28), and a quality metric is generated based on the read signal (block 30). At block 32 the process is repeated at least once from block 24, and a write power for the laser is configured based on a slope of the quality metric (block 34).

In the embodiment of FIG. 2B, the head 18 comprises a suitable write element 36, such as an inductive write coil, and a suitable read element 38, such as a magnetoresistive element. In the embodiment of FIG. 2A, the disk 16 comprises a plurality of servo sectors $40_0$-$40_N$ that define a plurality of servo tracks 42, wherein data tracks are defined relative to the servo tracks at the same or different radial density. The control circuitry 22 processes a read signal 44 emanating from the head 18 to demodulate the servo sectors $40_0$-$40_N$ and generate a position error signal (PES) representing an error between the actual position of the head and a target position relative to a target track. A servo control system in the control circuitry 22 filters the PES using a suitable compensation filter to generate a control signal 46 applied to a voice coil motor (VCM) 48 which rotates an actuator arm 50 about a pivot in order to actuate the head 18 radially over the disk 16 in a direction that reduces the PES. The servo sectors 40₀-40_N may comprise any suitable head position information, such as a track address for coarse positioning and servo bursts for fine positioning. The servo bursts may comprise any suitable pattern, such as an amplitude based servo pattern or a phase based servo pattern (FIG. 1).

In one embodiment, the write power applied to the laser 20 is calibrated so as to achieve a target output power, thereby enabling sufficient saturation of the magnetic surface as well as a target write width (and corresponding data track width). In the embodiment of FIG. 2C, a pattern is written to the disk at different laser powers (e.g., from a low laser power toward a high laser power) and a quality metric generated for each laser power by reading the pattern. Any suitable quality metric may be generated, such as the amplitude of the read signal (or gain setting of a variable gain amplifier (VGA)). In other embodiments, the quality metric may comprise other parameters of a read channel, such as a timing error, a branch metric of a trellis sequence detector, a bit error rate, a number of iterations of an iterative decoder, or any other suitable metric indicative of the quality of the recorded data.

Figure 6:
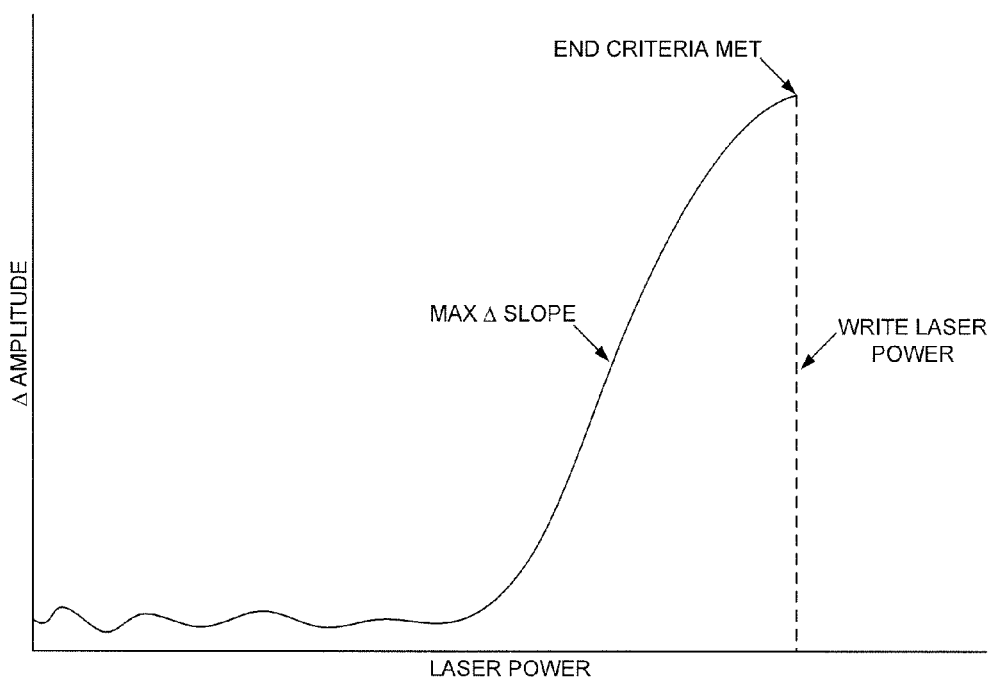
FIG. 6 illustrates an embodiment wherein the write laser power is selected relative to when an end criteria for the slope of the quality metric is satisfied.

At low laser power, there may be insufficient saturation of the disk and therefore the quality metric (e.g., the amplitude of the read signal) may also be low. As the laser power increases, the amplitude of the resulting read signal will eventually begin to increase as the laser heating begins to reduce the coercivity of the magnetic surface. As the laser power increases further, the amplitude of the resulting read signal will increase further until eventually saturating. For example, in one embodiment the width of the written data track may eventually exceed the width of the read element 38 (FIG. 2B) at which point the amplitude of the resulting read signal may saturate. In one embodiment, the write power for the laser is selected based on the slope of the quality metric, such as by selecting the write power where the quality metric begins to saturate (e.g., point when the slope of the quality metric decreases below a threshold such as shown in FIG. 6).

In one embodiment, the disk 16 may be erased prior to calibrating the write power for the laser. For example, the disk 16 may be bulk erased during a manufacturing process prior to inserting the erased disk into a disk drive. In this manner the initial quality metric (e.g., amplitude of the read signal) generated when calibrating the write power for the laser will correspond to an erased track. Also in this embodiment, the control circuitry 22 may write the pattern to a different erased track at each laser power in order to avoid the cumulative effect of writing the pattern to the same track at each laser power.

In another embodiment, at each laser power the control circuitry 22 may write two different patterns to the same target track and generate a quality metric for each pattern written. The control circuitry 22 may then evaluate the difference between the quality metrics to select the write power for the laser. This embodiment is understood with reference to the flow diagram of FIG. 3 wherein after adjusting the laser power (block 52), a first pattern is written to a target track at the adjusted laser power (block 54). The first pattern is read from the target track to generate a first read signal (block 56), and a first quality metric is generated based on the first read signal (block 58). A second pattern is written to the target track at the adjusted laser power (block 60). The second pattern is read from the target track to generate a second read signal (block 62), and a second quality metric is generated based on the second read signal (block 64). A third quality metric is generated based on the first quality metric and the second quality metric (block 66), and the slope of the third quality metric is evaluated (block 68) to determine whether it satisfies a suitable end criteria. If not, the flow diagram is repeated from block 52 until the end criteria for the slope of the third quality metric is satisfied at block 70. The write power for the laser is then configured for the laser based on the last adjustment to the laser power (block 72), such as by setting the write power to the last adjusted laser power, or by subtracting a suitable margin from the last adjusted laser power.

Figure 3:
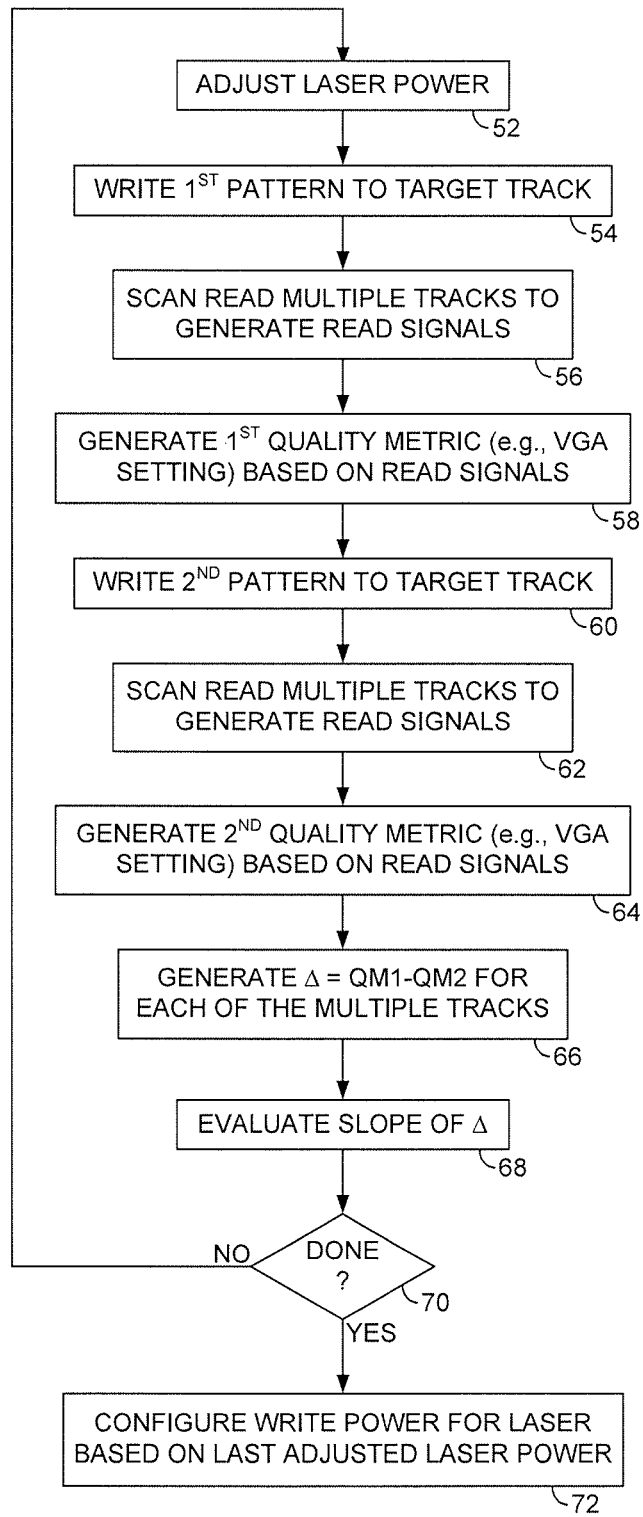
FIG. 3 is a flow diagram according to an embodiment wherein a first pattern is written/read to generate a first quality metric, a second pattern is written/read to generate a second quality metric, and a third quality metric is generated based on a difference between the first and second quality metrics.

The third quality metric may be generated based on the first and second quality metrics in any suitable manner. In the embodiment of FIG. 3, at block 66 the third quality metric is generated as the difference (Δ) between the first quality metric and the second quality metric. For example, in one embodiment the first quality metric may be a VGA setting when reading the first pattern and the second quality metric may be a VGA setting when reading the second pattern. Also in the embodiment of FIG. 3, the control circuitry 22 may scan read multiple tracks at block 56 and block 62 that are proximate the target track and generate the quality metrics for each track. This embodiment may account for a radial offset between the read element and the write element which may be unknown when calibrating the write power for the laser (and in one embodiment the radial offset may be concurrently calibrated when calibrating the write power for the laser).

Figure 4A:
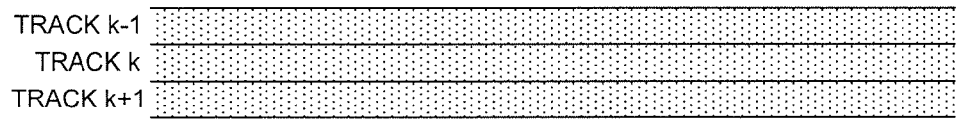
FIGS. 4A-4E illustrate an embodiment for writing the first pattern during a first revolution of the disk and reading the first pattern during a second revolution of the disk to generate the first quality metric, as well as writing the second pattern during a third revolution of the disk and reading the second pattern during a fourth revolution of the disk to generate the second quality metric.
Figure 4B:
Figure 4C:
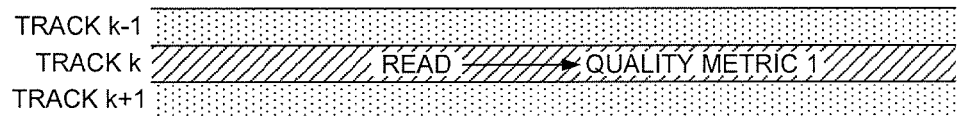
Figure 4D:
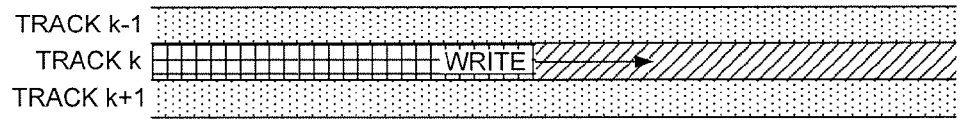
Figure 4E:
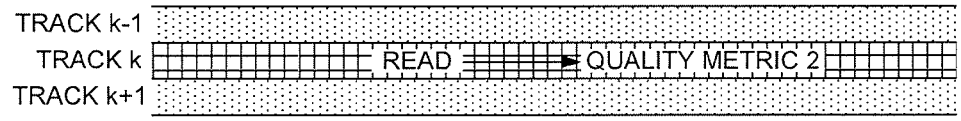

FIGS. 4A-4E illustrate an embodiment for writing first and second patterns to a target track at different laser powers and generating a corresponding quality metric for each pattern. In this embodiment, the target track is track k having adjacent tracks track k−1 and track k−1. FIG. 4A shows an initial state of the tracks which may be an erased state (e.g., AC or DC erased) or any random, unknown state after manufacturing the disk. During a first revolution of the disk, a first pattern is written to the target track as shown in FIG. 4B. During a second revolution of the disk, the first pattern is read to generate a first quality metric as shown in FIG. 4C. During a third revolution of the disk, a second pattern is written over the first pattern in the target track as shown in FIG. 4D. During a fourth revolution of the disk, the second pattern is read to generate the second quality metric as shown in FIG. 4E, wherein a third quality metric may be generated as the difference between the first and second quality metrics.

The first pattern written to the target track (e.g., FIG. 4B) may differ from the second pattern written to the target track (e.g., FIG. 4D) in any suitable manner. For example, in one embodiment the first pattern may comprise an AC or DC erase signal, and the second pattern may comprise a suitable periodic pattern such as a 2 T pattern. In another embodiment, the first pattern may comprise a first periodic pattern (e.g., a 2 T pattern) and the second pattern may comprise a second periodic pattern (e.g., a 5 T pattern). In one embodiment, the quality metric generated for each pattern may be generated by evaluating the read signal (or other metric) at the frequency of the pattern. For example, the amplitude of the read signal may be extracted at the frequency of the pattern using a discrete Fourier transform (DFT) in order to generate the first and second quality metric. In one embodiment, the first and second patterns are selected so that the magnetic transitions representing the first pattern are erased (overwritten) when the first pattern is overwritten with the second pattern, thereby avoiding any cumulative effect of writing the same pattern to the same target track.

Figure 5A:
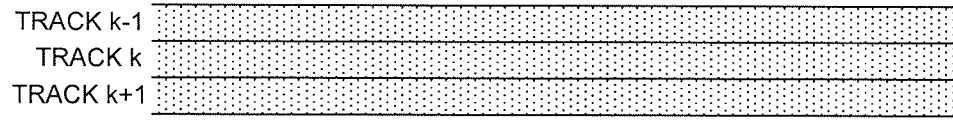
FIGS. 5A-5E illustrate an embodiment for writing the first and second pattern during a first revolution of the disk and reading the first and second pattern during a second revolution of the disk to generate the first and second quality metrics.
Figure 5B:
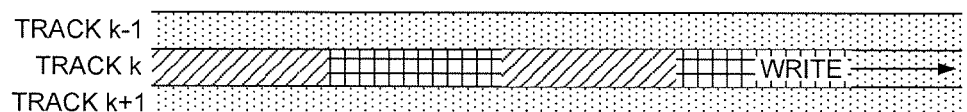
Figure 5C:
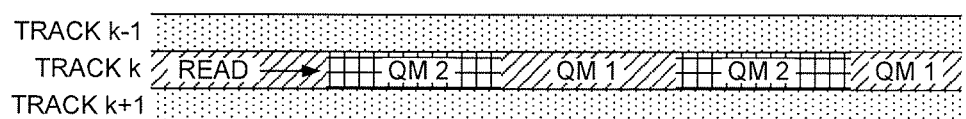
Figure 5D:
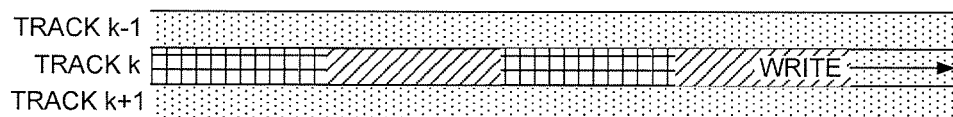
Figure 5E:
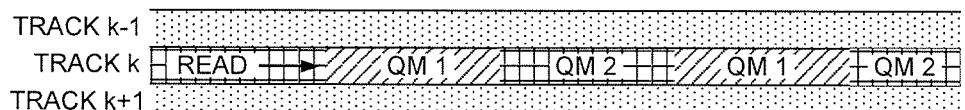

FIGS. 5A-5E illustrate an embodiment which may help expedite the calibration of the write power for the laser as compared to the embodiment described above with reference to FIGS. 4A-4E. In this embodiment, the target track k and adjacent tracks k−1 and k+1 are in an initial state as shown in FIG. 5A. During a first revolution of the disk, the first pattern is written over a first segment of the target track, and the second pattern is written over a second segment of the target track as shown in FIG. 5B. During a second revolution of the disk, the first pattern is read to generate the first quality metric and the second pattern is read to generate the second quality metric as shown in FIG. 5C. During a third revolution of the disk, the second pattern is written to the first segment of the target track (thereby overwriting the first pattern), and the first pattern is written to the second segment of the target track (thereby overwriting the second pattern) as shown in FIG. 5D. During a fourth revolution of the disk, the second pattern is read to generate the second quality metric and the first pattern is read to generate the first quality metric as shown in FIG. 5E. This embodiment expedites the calibration of the write power for the laser since the first and second patterns are both written during a single revolution of the disk and the first and second patterns are both read during a single revolution of the disk. Further, by switching the order of the written patterns as described above, the first pattern is overwritten by the second pattern (and vise versa) which avoids the cumulative effect of writing the same pattern to the same target track.

FIG. 6 shows an example quality metric (delta in VGA settings at block 66 of FIG. 3) that varies relative to the laser power. When the laser power is below the lasing threshold of the laser 20, the quality metric is also relatively low. When the laser power increases above the lasing threshold, the laser 20 begins heating the disk surface and the quality metric begins to increase (with a corresponding increase in the slope of the quality metric). When the laser power reaches a certain level, the slope of the quality metric relative to the laser power reaches a maximum value. As the laser power is further increased, the slope of the quality metric is evaluated until an end criteria is met as shown in FIG. 6, at which point the write power for the laser is selected based on the last adjustment to the laser power that achieved the end criteria.

Any suitable end criteria shown in FIG. 6 may be employed when evaluating the slope of the quality metric to calibrate the write power for the laser. In one embodiment, the end criteria is met when the following conditions are satisfied:

(a) Detla $\Delta$ Slope<=((Max $\Delta$ Slope)/2)
(b) Detla $\Delta$ Slope Change (Detla $\Delta$ Slope[N]−Detla $\Delta$ Slope [N−1])<Threshold
(c) (Detla $\Delta$ Slope[N])−(Detla $\Delta$ Slope[N−1])<Max $\Delta$ Slope
(d) (Detla $\Delta$ Slope[N−1])−(Detla $\Delta$ Slope[N−2])<Max $\Delta$ Slope wherein the change in the slope (Detla $\Delta$ Slope) of the quality metric is computed at conditions (a) and (b) using a three point curve fit operation, and the change in slope is computed at conditions (c) and (d) using a two point curve fit operation. In one embodiment, the conditions (c) and (d) help account for noise in the data points that may cause a false trigger of conditions (a) and (b).

Figure 7:
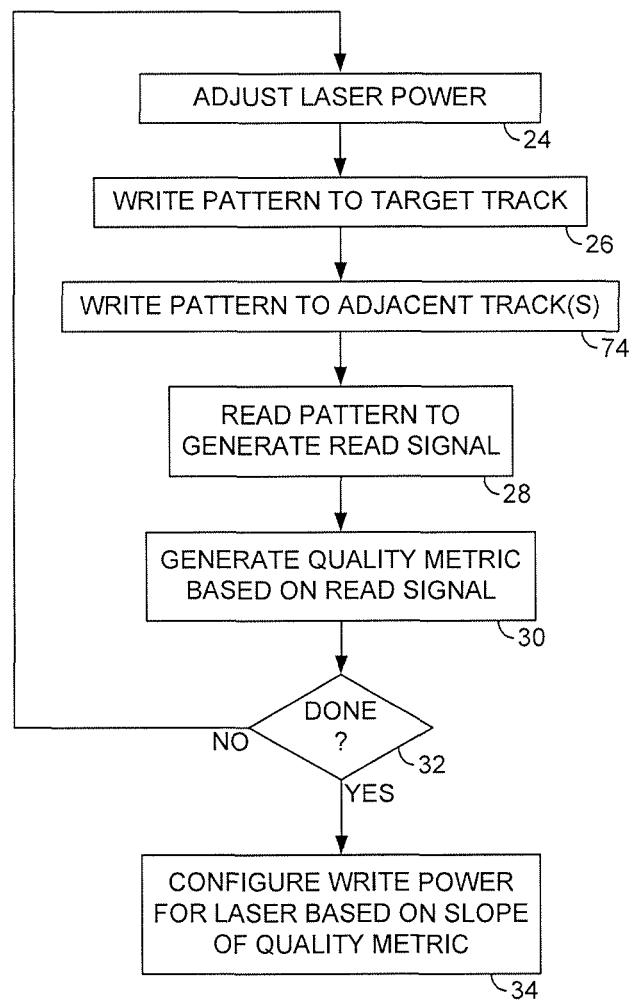
FIG. 7 is a flow diagram according to an embodiment wherein a pattern is written to at least one track adjacent the target track before generating the quality metric.

FIG. 7 is a flow diagram according to an embodiment which extends on the flow diagram of FIG. 2C wherein the control circuitry is further configured to write a pattern to at least one track adjacent the target track at each of the adjusted laser powers (block 74). This embodiment takes into account the effect of adjacent track interference (ATI) when calibrating the write power for the laser. That is, in one embodiment the optimal write power may be selected based on the slope of the quality metric given the effect of each laser power when writing to the target track as well as to at least one track adjacent the target track.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk;
   a head actuated over the disk, the head comprising a laser configured to heat the disk while writing data to the disk; and
   control circuitry configured to:
   (a) adjust a laser power for the laser;
   (b) write a pattern to a target track at the adjusted laser power;
   (c) read the pattern from the target track to generate a read signal;
   (d) amplify the read signal using a variable gain amplifier
   (e) generate a quality metric based on a setting for the variable gain amplifier;
   (f) repeat blocks (a) through (e) at least once; and
   (g) configure a write power for the laser based on a slope of the quality metric.

2. The data storage device as recited in claim 1, wherein the control circuitry is further configured to configure a write power for the laser based on a change in the slope of the quality metric.

3. The data storage device as recited in claim 1, wherein the pattern consists of a periodic pattern.

4. The data storage device as recited in claim 1, wherein block (b) further comprises writing a pattern to at least one track adjacent the target track at the adjusted laser power.

5. A data storage device comprising:
   a disk;
   a head actuated over the disk, the head comprising a laser configured to heat the disk while writing data to the disk; and
   control circuitry configured to:
   (a) adjust a laser power for the laser;
   (b) write a first pattern to a target track at the adjusted laser power;
   (c) read the first pattern from the target track to generate a first read signal;
   (d) generate a first quality metric based on the first read signal;
   (e) write a second pattern to the target track at the adjusted laser power;
   (f) read the second pattern from the target track to generate a second read signal;
   (g) generate a second quality metric based on the second read signal;
   (h) generate a third quality metric based on the first quality metric and the second quality metric;
   (i) repeat blocks (a) through (h) at least once; and
   (j) configure a write power for the laser based on a slope of the third quality metric.

6. The data storage device as recited in claim 5, wherein the control circuitry is further configured to configure a write power for the laser based on a change in the slope of the third quality metric.

7. The data storage device as recited in claim 5, wherein the first pattern consists of a DC pattern and the second pattern consists of a periodic pattern.

8. The data storage device as recited in claim 5, wherein the first pattern consists of a first periodic pattern having a first frequency and the second pattern consists of a second periodic pattern having a second frequency different from the first frequency.

9. The data storage device as recited in claim 5, wherein:
   the first quality metric is generated based on a first setting for a variable gain amplifier; and
   the second quality metric is generated based on a second setting for the variable gain amplifier.

10. The data storage device as recited in claim 9, wherein the control circuitry is further configured to generate the third quality metric based on a difference between the first quality metric and the second quality metric.

11. The data storage device as recited in claim 9, wherein the control circuitry is further configured to:
    write the first pattern to a first part of the target track; and
    write the second pattern to a second part of the target track.

12. The data storage device as recited in claim 11, wherein the control circuitry is further configured to write the first pattern and the second pattern to the target track during a first revolution of the disk.

13. The data storage device as recited in claim 12, wherein the control circuitry is further configured to read the first pattern and the second pattern from the target track during a second revolution of the disk.

14. A method of operating a data storage device, the method comprising:
    (a) adjusting a laser power for a laser;
    (b) writing a pattern to a target track on a disk at the adjusted laser power;
    (c) reading the pattern from the target track to generate a read signal;
    (d) amplifying the read signal using a variable gain amplifier;
    (e) generating a quality metric based on a setting for the variable gain amplifier;
    (f) repeating blocks (a) through (e) at least once; and
    (g) configuring a write power for the laser based on a slope of the quality metric.

15. The method as recited in claim 14, further comprising configuring a write power for the laser based on a change in the slope of the quality metric.

16. The method as recited in claim 14, wherein the pattern consists of a periodic pattern.

17. The method as recited in claim 14, wherein block (b) further comprises writing a pattern to at least one track adjacent the target track at the adjusted laser power.

18. A method of operating a data storage device, the method comprising:
    (a) adjusting a laser power for a laser;
    (b) writing a first pattern to a target track on a disk at the adjusted laser power;
    (c) reading the first pattern from the target track to generate a first read signal;
    (d) generating a first quality metric based on the first read signal;
    (e) writing a second pattern to the target track at the adjusted laser power;
    (f) reading the second pattern from the target track to generate a second read signal;
    (g) generating a second quality metric based on the second read signal;
    (h) generating a third quality metric based on the first quality metric and the second quality metric;
    (i) repeating blocks (a) through (h) at least once; and
    (j) configuring a write power for the laser based on a slope of the third quality metric.

19. The method as recited in claim 18, further comprising configuring a write power for the laser based on a change in the slope of the third quality metric.

20. The method as recited in claim 18, wherein the first pattern consists of a DC pattern and the second pattern consists of a periodic pattern.

21. The method as recited in claim 18, wherein the first pattern consists of a first periodic pattern having a first frequency and the second pattern consists of a second periodic pattern having a second frequency different from the first frequency.

22. The method as recited in claim 18, wherein:
the first quality metric is generated based on a first setting for a variable gain amplifier; and
the second quality metric is generated based on a second setting for the variable gain amplifier.

23. The method as recited in claim 22, further comprising generating the third quality metric based on a difference between the first quality metric and the second quality metric.

24. The method as recited in claim 18, further comprising:
writing the first pattern to a first part of the target track; and
writing the second pattern to a second part of the target track.

25. The method as recited in claim 24, further comprising writing the first pattern and the second pattern to the target track during a first revolution of the disk.

26. The method as recited in claim 25, further comprising reading the first pattern and the second pattern from the target track during a second revolution of the disk.

\* \* \* \* \*